United States Patent [19]

Lastinger

[11] Patent Number: 4,545,511
[45] Date of Patent: Oct. 8, 1985

[54] PEANUT SEED METER

[75] Inventor: Anthony Lastinger, Tifton, Ga.

[73] Assignee: Kelley Manufacturing Company, Tifton, Ga.

[21] Appl. No.: 436,673

[22] Filed: Oct. 26, 1982

[51] Int. Cl.$^4$ .............................................. A01C 7/00
[52] U.S. Cl. .................................... 222/367; 222/408; 111/77
[58] Field of Search ............... 222/290, 317, 328, 367, 222/370, 410, 408; 221/265; 111/77

[56] References Cited

U.S. PATENT DOCUMENTS

| 534,361 | 2/1895 | Courtney | 221/265 X |
| 760,394 | 5/1904 | Heylman | 221/265 X |
| 1,128,323 | 2/1915 | Johnstone | 222/370 X |
| 1,210,636 | 1/1917 | Garst | 222/290 X |
| 2,369,508 | 2/1945 | White | 222/290 X |
| 2,576,693 | 11/1951 | Oehler | 222/410 UX |
| 2,685,988 | 8/1954 | Nelson et al. | 222/370 |
| 2,764,321 | 9/1956 | Gerdes et al. | 222/317 X |
| 3,251,513 | 5/1966 | Johnson et al. | 222/410 X |

Primary Examiner—Joseph J. Rolla
Assistant Examiner—Frederick R. Handren
Attorney, Agent, or Firm—Robert M. Ward

[57] ABSTRACT

The present invention is directed to an improved peanut seed meter including a peanut hopper bottom having an outer disposed ring for engaging the seed hopper, and an inner disposed dome to define a peanut seed feeding space there-between. The hopper bottom and the dome are connected by a seed drop cover, defining a volume thereunder. A floor plate is disposed beneath the peanut hopper bottom and includes a seed drop aperture thereon. A generally truncated cone-shaped rotating seed plate is disposed above the floor plate and has means thereon for receiving individual seeds. A generally half crescent-shaped taper gate extends from the seed drop cover and around the dome for gating off a portion of the peanut seeds from those being rotationally carried by the rotating seed plate, and to permit a second portion of the peanut seeds to pass therebeneath to the seed drop aperture of the floor plate for planting.

26 Claims, 6 Drawing Figures

PEANUT SEED METER

BACKGROUND OF THE INVENTION

The present invention is directed generally to peanut meters and more particularly to an improved peanut seed meter for continuously removing a selected quantity of seed peanuts at a selected rate from a bulk quantity thereof for planting.

The planting of peanuts presents problems that are unique, because of the relative fragility of the peanut seed, and because of the relatively large size thereof. One problem associated therewith has been the skipping of seeds within a row due to the interruption of the flow of peanut seeds, such as may be caused by jamming or interruptions of flow within the peanut seed meter. Some prior art devices have sought to alleviate such skips in the row, but have been susceptible to splitting, breaking or skinning of the peanut seed kernels.

Other peanut seed meters have functioned relatively well in avoiding skips in the row and in avoiding damaged kernels, but have been capable of planting peanuts only at a relatively slow flow rate which has added to the time of labor required and has resulted in increased labor expense associated with in the peanut planting operation.

Yet other peanut meters have functioned well in some respects, but have functioned only for small peanut kernels, or for large peanut kernels, and have lacked adjustability features which would render them capable of functioning efficiently for different sizes of peanuts.

Yet other peanut meters have been of such structural design as to require molded plastic parts for economy of manufacture in order to render them competitive with other peanut meters.

In view of the shortcomings and deficiencies of the prior art, it has been an object of the improved peanut seed meter of the present invention to deliver a constant and uninterrupted flow of seeds for fewer skips in the row, and to simultaneously therewith handle seeds easily and gently to reduce split, broken and/or skinned kernels. A further object of the present invention has been to provide a preferably half crescent-shaped taper gate to channel off excess peanut seeds and to direct them back into the seed flow without interruptions and/or hesitations that may cause skips in the row. A yet additional object is to provide such a taper gate which is adjustable in order to vary the poundage of peanuts planted per acre in conjunction with other adjustable features, such as sprocket sizes, to render the improved peanut seed meter of the present invention of optimal adjustability. A yet further object of the improved peanut seed meter of the present invention is to provide a structure which can be economically produced of cast iron without the necessity of resorting to molded plastic parts because of the structural design thereof.

SUMMARY OF THE INVENTION

The improved peanut seed meter of the present invention includes a peanut hopper bottom for disposition within the peanut hopper which includes an outer disposed ring having a downwardly disposed surface thereon for channeling the peanuts downwardly and preferably inwardly therefrom. A peanut seed drop cover is provided to be disposed radially from such outer disposed ring to define a peanut seed exit volume therebeneath.

Means, such as a floor plate in some preferred embodiments, are disposed beneath the seed drop cover for defining a seed drop aperture therein for planting the seeds. A rotating seed plate for receiving channeled peanut seeds from at least the downwardly disposed surface of the outer disposed ring, and having peanut receiving indentations preferably on a peripheral circumferential surface thereof, is provided to pass peanut seeds carried thereon rotationally into the peanut seed exit volume.

A taper gate extends generally horizontally adjacent the seed drop cover and rotationally in advance of the peanut seed exit volume, and extends across the rotational path of the peanut receiving indentations of the rotating seed plate for gating off a first portion of the peanut seeds carried by the rotating seed plate. A second portion of the peanut seeds passes beneath the taper gate to the seed drop aperture within the seed exit volume to drop from such aperture for planting.

Additional features of the improved peanut seed meter of the present invention will become apparent to those skilled in the art in view of the following brief description of the drawing, detailed description of preferred embodiments, accompanying drawing, and appended claims.

BRIEF DESCRIPTION OF THE DRAWING

The improved peanut seed meter of the present invention is set forth pictorially in the accompanying drawing, wherein.

DETAILED DESCRIPTION OF PREFERRED EMBODIMENTS

Figure 1:
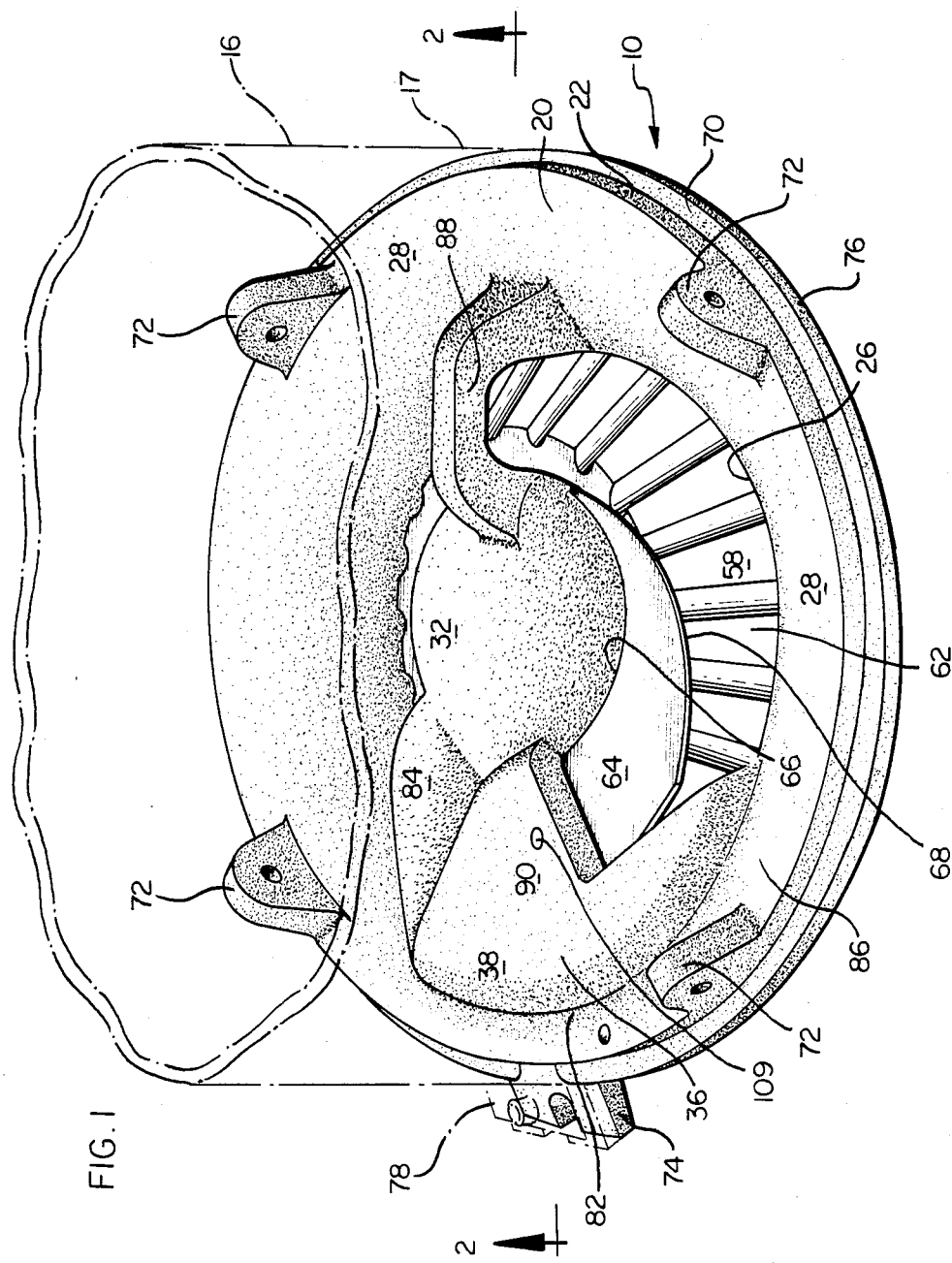
FIG. 1 is an enlarged top perspective view of the improved peanut seed meter of the present invention, showing the related peanut seed hopper in fragmented phantom lines disposed thereabove, also showing the peanut hopper bottom with its outer disposed ring, inner disposed dome and connecting seed drop cover means with attached generally half crescent shaped taper gate extending therefrom, and further showing therebeneath the generally truncated cone-shaped rotating seed plate with peanut receiving grooves on the sloped surface thereof.

The improved peanut seed meter of the present invention functions to continuously remove at a selected rate a selected quantity of seed peanuts from a bulk quantity thereof for planting. The improved seed meter of the present invention is contained within a peanut seed hopper at the bottom portion thereof, and first includes a peanut hopper bottom portion. The peanut hopper bottom includes means for attachment thereof to the bottom rim of the peanut hopper and also an adjoining outer disposed ring. The outer disposed ring of the peanut hopper bottom has an exterior diameter of a size for engaging the lower lip of the hopper and an interior diameter. The top surface of the outer disposed ring slopes downwardly from the exterior diameter and inwardly toward the interior diameter, to define an interior diameter rim which extends downwardly for at least a major radial portion thereof. A dome means is disposed interiorly of the outer disposed ring and is attached thereto. The inner disposed dome has a diameter substantially smaller than the interior diameter of the outer disposed ring to define a peanut seed feeding space there-between.

A seed drop cover means connects the outer disposed ring and the inner disposed dome and has a substantial radial width, with a preferably countoured and sloping upper surface, with the inner disposed dome being suspended in preferred embodiments substantially above the level of the downwardly extending interior diameter rim, thereby to define a peanut seed exit volume beneath the seed drop cover means and a peanut return means thereover.

A generally annular shaped floor plate is disposed beneath the peanut hopper bottom and has a central opening therein which is adapted for receiving a drive shaft therethrough. The top surface of the floor plate is disposed at least in very near proximity to, if not in contact with, the lower surface of the peanut hopper bottom at the downwardly extending interior diameter ring thereof. The floor plate includes a seed drop aperture at the outer diameter thereof which is disposed below the seed drop cover of the peanut hopper bottom and within the peanut seed exit volume.

A generally truncated cone-shaped rotating seed plate has means thereon for receiving rotational drive from a drive shaft which extends through the floor plate. The rotating seed plate is disposed on the top surface of the annular-shaped floor plate and beneath the dome in the space defined therebetween. The seed plate preferably has a major diameter slightly less than the interior diameter of the outer disposed ring, and a minor diameter generally corresponding to the diameter of the dome disposed thereabove. Thus, the sloping conical surface of the seed plate extends substantially between the lower surface of the dome and the interior diameter rim of the outer disposed ring and within in the peanut seed feeding space. The sloping conical surface of the seed plate includes grooves radially disposed therearound for receiving peanut seeds in the peanut seed feeding space, and upon rotation of the seed plate into the peanut seed exit volume for discharging the carried peanut seeds through the seed drop aperture of the floor plate. Seed plates having radially disposed grooves of different sizes may be provided for planting peanut seeds of different sizes.

A taper gate, which is generally preferably half crescent-shaped in form, extends from the seed drop cover of the peanut hopper bottom in a counter-clockwise direction, which is the direction opposite to the rotational direction of the clockwise rotating seed plate. The taper gate has an inside radius preferably substantially corresponding to that of the dome of the hopper bottom and disposed adjacently thereto, and preferably has a slightly larger outside radius with a center slightly offset from the inside radius, to extend generally horizontally from the dome of the peanut hopper bottom in a curved path across the peanut feeding space to the outer disposed ring of the peanut hopper bottom. The functioning of the taper gate structure is to gate off a first portion of the peanut seeds from those being rotationally carried by the rotating seed plate. A second portion of the peanut seeds is permitted to pass beneath the taper gate into the peanut seed exit volume to the seed drop aperture of the flow plate for planting. The first portion of peanut seeds is then returned to the rotating seed plate by channel means for planting in a subsequent rotation thereof. The functioning of the taper gate is to gradually move the excess peanuts out of the main stream, which reduces the possibility of those peanuts being damaged.

The peanut hopper bottom may preferably include a groove at the exterior diameter thereof for engagement with the lower rim of the hopper. The peanut hopper bottom may also preferably include a plurality of upwardly extending and radially disposed ear members for receiving bolts to further secure the hopper bottom to the hopper. Also, in preferred embodiments the peanut hopper bottom may further include a hopper lock bracket extending radially from the outer diameter thereof for mating engagement with a corresponding locking bracket on the hopper. As a further securement means, the hopper lock bracket may be preferably securable by a wing nut. The peanut hopper bottom may also include hinge brackets extending from the bottom surface thereof, and the floor plate may include corresponding hinge brackets extending radially outward from the perimeter thereof for engagement with the corresponding hinge brackets disposed at the bottom surface of the peanut hopper bottom.

In preferred embodiments of the improved peanut seed meter of the present invention, the peanut hopper bottom includes channel means for directing the flow of gated off peanut seeds back onto the seed plate. Such channel means preferably may comprise a channel area on the outer ring of the hopper bottom, which channel means is disposed radially exterior of the seed drop cover, and at a lower vertical level than the contoured top of the seed drop cover, to receive peanut seeds therefrom. Such channel means extend generally circumferentially from adjacent the outside radius of the taper gate to the termination of the seed drop cover.

The seed drop cover may preferably include an upwardly inclined terminal portion to provide supplemental channeling to the gated off peanut seeds. The seed drop cover may also in preferred embodiments slope downwardly adjacent the channel means and from a dome-shaped upper surface for further supplementing the channeling of the gated off peanut seeds.

The downward and inward slope of the outer disposed ring of the peanut top or bottom may preferably be of reduced magnitude within the channel for the gated off peanut seeds to facilitate such channeling.

The inner disposed dome of the peanut hopper bottom may be preferably supplementally attached to the outer disposed ring by at least one upwardly extending bridge means to provide support opposite the attachment of the dome adjacent the seed drop cover means. The upper surface of the portion of the seed drop cover of the peanut hopper bottom which is radially adjacent the taper gate may be preferably substantially planar.

The top surface of the floor plate may preferably engage the lower surface of the peanut hopper bottom at the downwardly extending interior rim thereof. The downwardly extending interior rim of the peanut hopper bottom may preferably extend in a curve path radially outwardly in the area immediately radially in advance of the seed drop aperture of the floor plate disposed therebeneath, which functions to direct the flow of peanut seeds carried by the seed plate to the seed drop aperture for planting.

The seed plate of the improved peanut seed meter of the present invention preferably includes an annular groove on the underside thereof, and preferably also includes a plurality of radially disposed and upwardly extending lugs for centering the seed plate with respect thereto. The seed plate may include drive lugs extending from the lower surface thereof for engaging with the shaft providing the rotational drive. The conical surface of the seed plate slopes downwardly and may preferably be at an angle which is approximately 60° to the vertical.

The taper gate may be disposed at a slight angle to the horizontal with the base of the taper gate inclined upwardly from the point of the preferably crescent-shaped taper gate, which promotes more room for peanut seeds to be directed into the peanut seed exit volume. The crescent-shaped taper gate preferably extends from the terminal portion thereof approximately 180° to the seed drop aperture. Such terminal portion may be pointed in preferred embodiments. Also in preferred embodiments, the crescent-shaped taper gate may gradually increase in radial width from the terminal portion thereof until its width covers the peanut seed feeding space after approximately 107° in radial distance.

Another feature of the present invention relates to an improvement for utilization in conjunction with certain types of peanut seed meters of which the above described peanut seed meter is but one example. Such peanut meters include a peanut hopper bottom having an outer disposed ring with a downwardly disposed surface thereon for channeling peanuts downwardly therefrom, and also include a seed drop cover disposed radially from the outer disposed ring to define a peanut seed exit volume therebeneath. Such peanut seed meters also include a rotating seed plate for receiving channeled peanut seeds at least from the downwardly disposed surface of the outer disposed ring and having peanut receiving indentations thereon to pass rotationally into the peanut seed exit volume.

The improvement for such peanut seed meters is directed to a taper gate which extends generally horizontally adjacent the seed drop cover and rotationally in advance of the peanut seed exit volume, and extends across the rotational path of the peanut receiving rotating seed plate. The taper gate improvement of the present invention gates off a first portion of the peanut seeds carried by the rotating seed plate and permits a second portion of the peanut seeds to pass therebeneath to the seed drop aperture within the peanut seed exit volume for planting.

In preferred embodiments of the improved taper gate of the present invention, the taper gate may be preferably generally half crescent in shape and has a radially outwardly disposed outer edge which extends across and above the peanut seed feeding indentations of the rotating seed plate toward the peanut seed exit volume, and such radially outwardly disposed edge may be curved to extend spirally thereacross. Such improved taper gate of the present invention may be further utilized in conjunction with peanut hoppers including peanut hopper bottoms which include channel means for urging the flow of gated off peanut seeds back onto the rotating seed plate for further gating off by the improved taper gate. The improved taper gate of the present invention may preferably be disposed at a slight angle to the horizontal with the taper gate having a base portion disposed adjacent the seed drop cover and a terminal portion extending therefrom, with the taper base portion inclined slightly upwardly from the terminal portion. The improved functional result of such improved structure is to provide more room for peanut seeds for being directed into the peanut seed exit volume for exiting through the seed drop aperture. Such an improved taper gate of the present invention includes a base portion which is disposed adjacent the seed drop cover and a terminal portion thereof which may preferably extend approximately 180° circumferentially therefrom.

Figure 2:
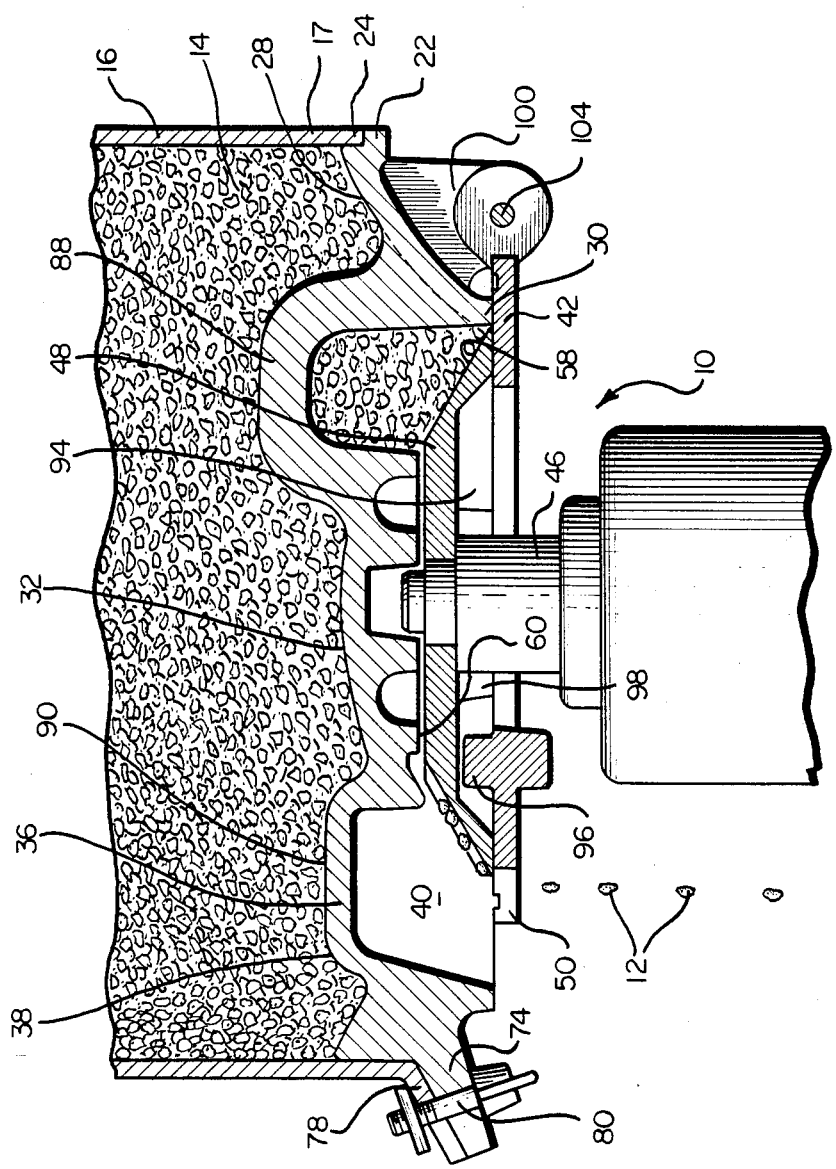
FIG. 2 is an enlarged transverse cross-sectional view taken along line 2—2 of FIG. 1, showing the volume of peanut seeds within the peanut hopper, the peanut hopper bottom including the inner disposed dome and the downwardly sloped top surface of the outer disposed ring thereof, and the seed drop cover attaching the outer disposed ring and the dome to define a peanut seed exit volume therebeneath, with peanut seeds being carried on the sloped surface of the generally truncated cone-shaped rotating seed plate for exiting through the peanut seed drop aperture for planting, also showing means for rotationally driving the generally truncated cone-shaped rotating seed plate, such rotational means being disposed through the floor plate, and further showing means for connecting the peanut hopper bottom to the peanut hopper.
Figure 3:
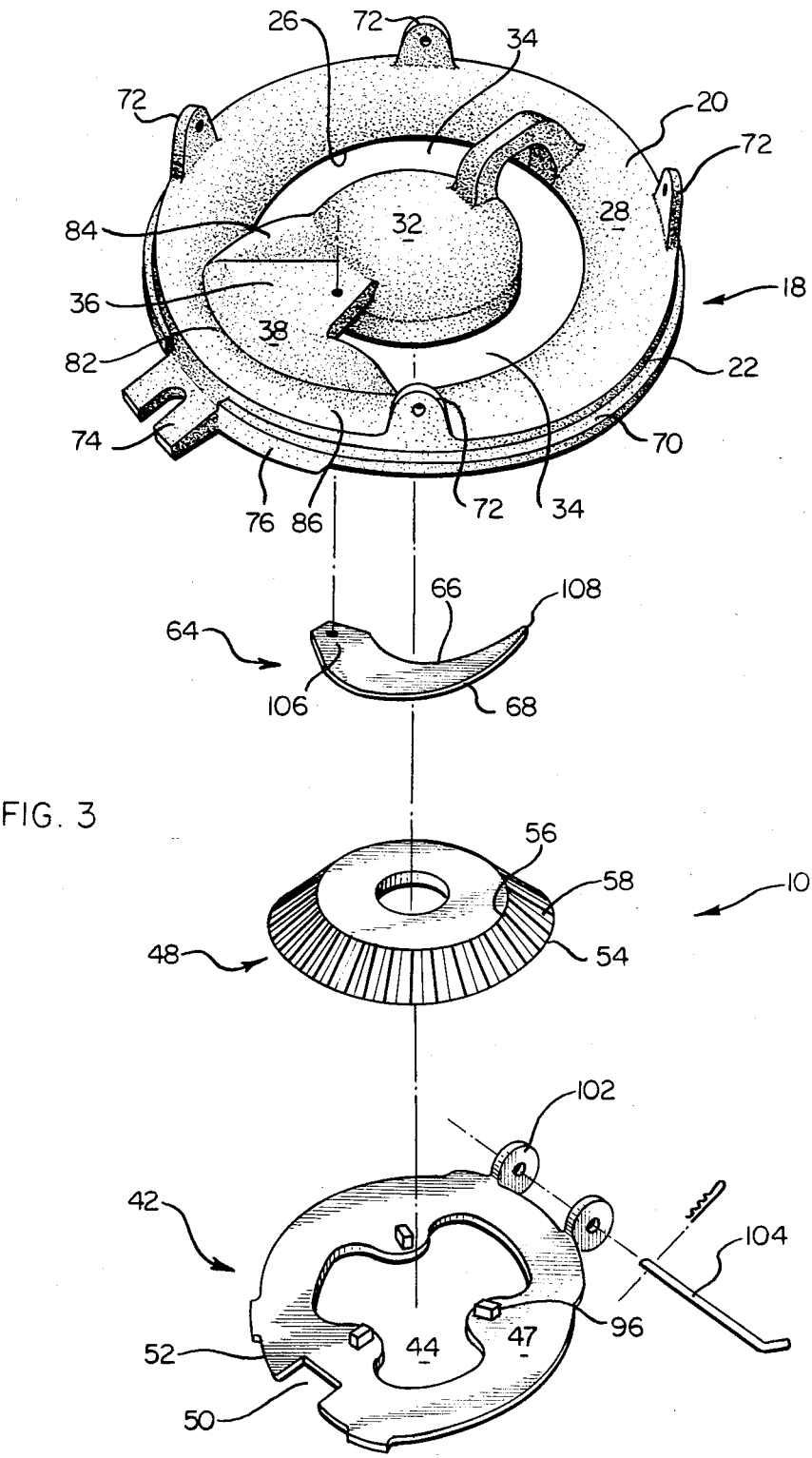
FIG. 3 is an expanded perspective view, showing (from top to bottom) the peanut hopper bottom, the generally half-crescent-shaped taper gate, the generally truncated cone-shaped rotating seed plate, and the floor plate with pin means for attachment thereof.
Figure 5:
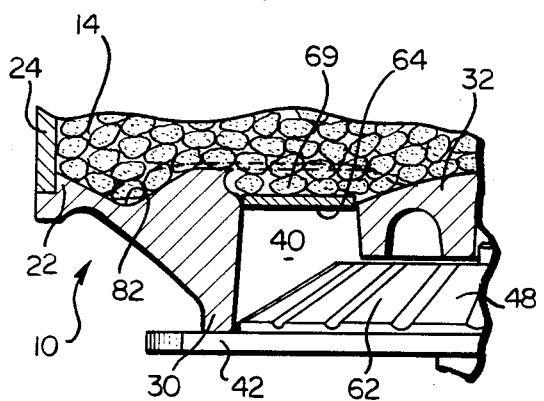
FIG. 5 is a fragmented transverse cross-sectional view taken along line 5—5 of FIG. 4, showing the transversely relatively broad base portion of the taper gate abutting upon the dome means, and to the left thereof the preferably contoured seed drop cover means for directing the flow of peanut seeds (see Arrow A) to the channel means for directing the flow of gated off peanut seeds back onto the seed plate, and showing beneath the taper gate the peanut seed exit volume which is defined at its bottom portion by the generally truncated cone-shaped rotating seed plate.
Figure 6:
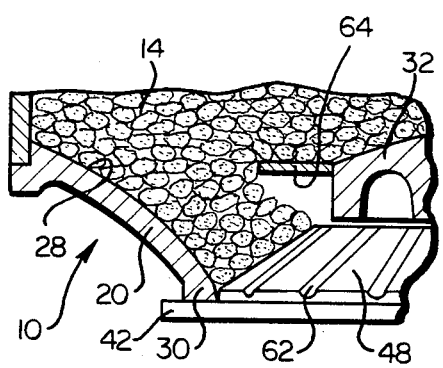
FIG. 6 is a fragmented transverse cross-sectional view taken along line 6—6 of FIG. 4, showing a tip portion of the taper gate at a substantial circumferential distance from the base portion of the taper gate as shown in FIG. 5, such tip portion to begin the gating off function of peanut seeds from the generally truncated cone-shaped rotating seed plate.

Referring now to the Figures in which common reference numerals are utilized to designate common elements, the improved peanut seed meter of the present invention generally 10 functions to continuously remove a selected quantity of seed peanuts 12 at a selected rate from a bulk quantity 14 as shown in FIG. 2 contained within hopper 16 for planting. The improved seed meter of the present invention 10 is disposed on peanut seed hopper 16 at bottom portion 17 thereof and includes a peanut hopper bottom portion generally 18 as shown in FIG. 3. Peanut hopper bottom 18 includes outer disposed ring 20. Outer disposed ring 20 of peanut hopper bottom 18 has an exterior diameter 22 of a size for engaging the lower lip 24 of hopper 16, as shown in FIGS. 2, 5 and 6, and an interior diameter 26 as shown in FIGS. 1 and 3. The top surface 28 of outer disposed ring 20 slopes downwardly from exterior diameter 22 and inwardly toward interior diameter 26 to define an interior diameter rim 30, which rim 30 extends downwardly for at least a major radial portion thereof. A dome means 32 is disposed interiorly of outer disposed ring 20 and is attached thereto. Inner disposed dome 32 has a diameter substantially smaller than interior diameter 26 of outer disposed ring 20 to define a peanut seed feeding space 34 there between as shown in FIG. 3.

A seed drop cover means 36 connects outer disposed ring 20 and inner disposed dome 32 and has a substantial circumferential width and a contoured and preferably semi-dome-shaped upper surface 38, with seed drop cover means 36 being suspended in preferred embodiments substantially above the level of the downwardly extending interior diameter rim 30, thereby to define a peanut seed exit volume 40 beneath seed drop cover means 36, as shown in FIGS. 2 and 5.

Figure 4:
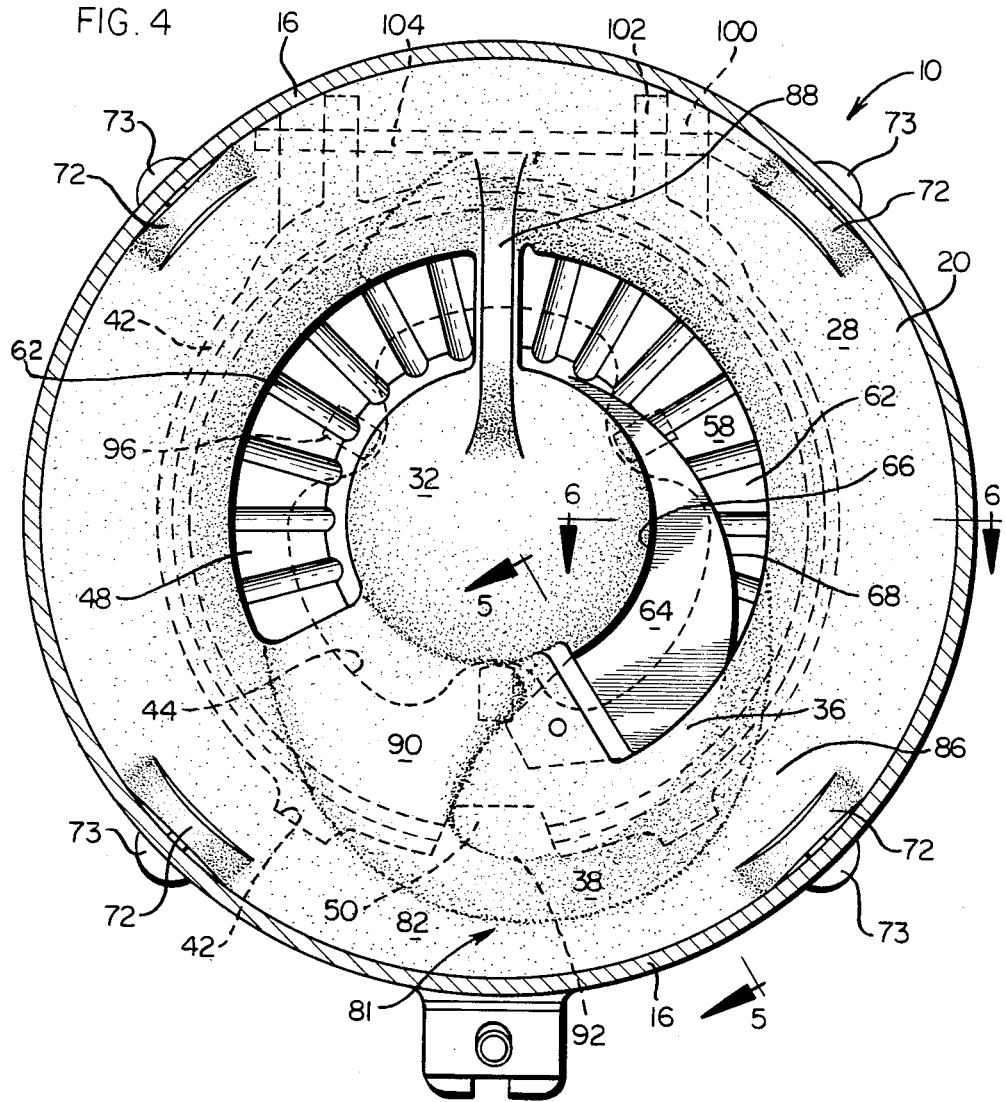
FIG. 4 is an enlarged plan view of the improved peanut seed meter of the present invention, showing the surrounding peanut hopper containing the peanut hopper bottom and illustrating (in shading) the contours of the seed drop cover means to form a preferably peripheral channel means for directing the flow of the first portion of peanut seeds when gated off the rotating seed plate by the taper gate thereonto, and for returning such first portion peanut seed flow in a generally clock-wise direction to the truncated cone-shaped rotating seed plate peanut grooves, and showing in phantom lines the shape of the floor plate disposed beneath the truncated cone-shaped rotating seed plate.

A floor plate generally 42 is disposed beneath peanut hopper bottom 18 and has a central opening 44 therein which is adapted for receiving a drive shaft 46 therethrough as shown in FIG. 2, and is generally annular in shape. Top surface 47 of floor plate 42 is disposed at least preferably snuggly against downwardly extending interior diameter rim 30 of peanut hopper bottom 18 to define a space therebetween for containing the rotating seed plate generally 48, as shown in FIGS. 2 and 3. Floor plate 42 includes a seed drop aperture 50 at the outer diameter 52 thereof as shown in FIGS. 2, 3 and 4, with seed drop aperture 50 being disposed below seed drop cover 36 of peanut hopper bottom 18 as shown in FIG. 2. Generally truncated cone-shaped rotating seed plate 48 receives rotational drive from drive shaft 46 which extends through floor plate 42. Rotating seed plate 48 is disposed on top surface 47 of the annular-shaped floor plate 42 and beneath dome 32 in the space defined therebetween.

Seed plate 48 preferably has a major diameter 54 slightly less than interior diameter 26 of outer disposed ring 20, and a minor diameter 56 generally corresponding to the diameter of dome 32 disposed thereabove as shown in FIG. 2. The resultant functioning is that the sloping conical surface 58 of seed plate 48 extends substantially between lower surface 60 of dome 32 and interior diameter rim 30 of outer disposed ring 20 and within and downwardly across peanut seed feeding space 34. Sloping conical surface 58 of seed plate 48 includes grooves 62 as shown in FIGS. 4, 5 and 6 radially disposed therearound for receiving peanut seeds 12 and upon rotation of seed plate 48 for carrying peanut seeds 12 into peanut seed exit volume 40 for discharge through seed drop aperture 50 of floor plate 42.

A taper gate generally 64 which is generally preferably half crescent-shaped in form, extends from seed drop cover 36 of peanut hopper bottom 18 in the direction opposite to the rotational direction of rotating seed plate 48. Taper gate 64 has an inside radius 66 preferably substantially corresponding to that of dome 32 of hopper bottom 18 and is disposed adjacently thereto. Taper gate 64 preferably has a slightly larger outside radius 68 with a center slightly offset from that of inside radius 66 to extend generally horizontally from dome 32 to peanut hopper bottom 18 in a curved path across peanut feeding space 34 to outer disposed ring 20 of peanut hopper bottom 18 as shown in FIGS. 1 and 4. The functioning of taper gate 64 is to gate off a first portion 69 of peanut seeds as shown in FIG. 5 from those being rotationally carried by rotating seed plate 48. A second portion of the bulk 14 of peanut seeds is permitted to pass beneath taper gate 64 to enter peanut seed exit volume 40 for discharge through seed drop aperture 50 of floor plate 42 for planting as shown in FIG. 2. Such first portion 69 of peanut seeds is preferably then returned to rotating seed plate 48 for planting in a subsequent rotation thereof.

Peanut hopper bottom 18 may preferably include a groove 70 at exterior diameter 22 thereof for engagement with lower rim 24 of hopper 16. Peanut hopper bottom 18 may also preferably include a plurality of upwardly extending and radially disposed ear members 72 for receiving bolts 73 to further secure hopper bottom 18 to hopper 16, as shown in FIG. 4. Also, in preferred embodiments peanut hopper bottom 18 may further include a hopper lock bracket 74 extending radially from outer edge portion 76 thereof for mating engagement with a corresponding locking bracket 78 on hopper 16, as shown in FIGS. 1, 2 and 3. As a further securement means, hopper lock bracket 74 may be preferably securable by a wing nut 80.

In preferred embodiments of the improved peanut seed meter of the present invention 10, peanut hopper bottom 18 may further include channel means generally 81 for directing the flow of gated off peanut seeds back onto seed plate 48. Such channel means 81 preferably comprise a channel area 82 on outer disposed ring 20 thereof which is disposed radially exteriorly of seed drop cover 36 and at a lower vertical level than seed drop cover 36 to receive peanut seeds therefrom. Such channel means 81 extends generally circumferentially adjacent outside radius 68 of taper gate 64 to the terminal prominence 84 of seed drop cover 36. Such upwardly inclined terminal prominence 84 provides supplemental channeling to the gated off peanut seeds as shown in FIGS. 1 and 3.

The downward and inward sloping surface 28 of outer disposed ring 20 of peanut hopper bottom 18 may preferably be of reduced magnitude within the channel means 81 for the gated off peanut seeds to facilitate such channeling, as shown in FIGS. 1 and 4 at reduced slope portion 86.

Inner disposed dome 32 of peanut hopper bottom 18 may be preferably supplementally attached to outer disposed ring 20 by at least one upwardly extending bridge means 88 to provide support opposite the attachment of dome 32 to seed drop cover means 36. Upper surface 90 of the portion of seed drop cover 36 of peanut hopper bottom 18 which is radially adjacent taper gate 64 may be preferably substantially planar.

Top surface 47 of floor plate 42 may preferably engage the lower surface of peanut hopper bottom 18 at downwardly extending interior rim 30 thereof. Downwardly extending interior rim 30 of peanut hopper bottom 18 may preferably extend in a curve path radially outwardly as shown at curved portion 92 in FIG. 4 in the area immediately radially in advance of seed drop aperture 50 which is disposed therebeneath, which curved portion 92 functions to direct the flow of peanut seeds carried by seed plate 48 into seed drop aperture 50 for planting.

Seed plate 48 of improved peanut seed meter 10 preferably includes an annular groove 94 on the underside thereof, and floor plate 42 preferably includes a plurality of radially disposed and upwardly extending lugs 96 for centering seed plate 48 with respect thereto, as shown in FIG. 2. Seed plate 48 may include drive lugs 98 extending from the lower surface thereof for engaging with shaft 46 providing the rotational drive.

Peanut hopper bottom 18 may also include hinge brackets 100 extending from the bottom surface thereof, and floor plate 42 may include corresponding hinge brackets 102 extending radially outward from the perimeter 52 thereof for engagement with corresponding hinge brackets 100 disposed at the bottom surface of peanut hopper bottom 18. A hinge pin 104 may be used to secure the same.

Taper gate 64 may be disposed at a slight angle to the horizontal with the base 106 as shown in FIG. 3 of taper gate 64 inclined upwardly from the point 108 of taper gate 64.

Accordingly, by utilizing a rotating seed plate having peanut carrying grooves 62 of different sizes, the improved peanut seed meter of the present invention may be utilized in conjunction with small peanuts (Spanish peanuts, approximately 1000 peanuts per pound) medium peanuts (Florunner peanuts, approximately 760 peanuts per pound) and large peanuts (Florgiant peanuts, approximately 550 peanuts per pound).

Additionally, the seed rate may be adjusted by the utilization of various sprocket combinations, and with different taper gate settings, as shown in TABLE I. Taper gate 64 may be adjusted to different horizontal levels by using gate spacers disposed between taper gate base 106 and the under surface of seed drop cover 36 where taper gate 64 is attached, as by screw 109. When taper gate 64 is attached to seed drop cover 36 with no spacers therebetween, taper gate 64 is wide open. When one spacer is utilized between taper gate 64 and seed drop cover 36, taper gate 64 is at a medium setting. When two spacers are disposed between taper gate 64 and seed drop cover 36, taper gate 64 is set at its most narrow setting. When taper gate 64 is adjusted to its wide open setting, it is thus at its maximum height above seed plate 48. TABLE I hereinbelow sets forth the approximate pounds of peanuts planted per acre for 36 inch rows.

| Sprocket Combinations | | Spanish Peanuts Approx. 1000 Per Pound) Peanut Plate With Narrower Gate Open | Flo Runner Peanuts (Approx. 760 Per Pound) Peanut Plate With Narrower Gate Open | Flori-Giant Peanuts (Approx. 550 Per Pound) Peanut Plate With Broader Gate Open |
|---|---|---|---|---|
| Driver | Driven | | | |
| 20 | 20 | 148 | 133 | — |
| 14 | 14 | 148 | 133 | — |
| 20 | 22 | 135 | 125 | — |
| 9 | 11 | 126 | 117 | — |
| 11 | 14 | 124 | 109 | 163 |
| 14 | 20 | 113 | 102 | 143 |
| 9 | 14 | 105 | 95 | 137 |
| 14 | 22 | 104 | 93 | 132 |
| 11 | 20 | 93 | 81 | 112 |
| 11 | 22 | 85 | 74 | 104 |
| 9 | 20 | 75 | 70 | 91 |
| 9 | 22 | 68 | 63 | 82 |

APPROXIMATE POUNDS OF PEANUTS PER ACRE FOR 36 INCH ROWS

The flexibility of peanut seed meter (L) of the present invention is shown in TABLE I. Although the figures of TABLE I are meant to be approximate starting guides, the actual seeding rate may vary as much as 5%–10% depending, inter alia, on wheel slippage. The medium and narrow settings of taper gate 64 are most beneficial for very low seeding rates or for extra small peanut seeds.

Although the peanut seed meter of the present invention has been described in terms of preferred methods and structures, it will be readily apparent to those skilled in the art that many alterations and modifications thereto may be made without departing from the invention. Accordingly, it is intended that all such modifications and alterations be included within the scope of the invention as defined by the appended claims and equivalents thereof.

What is claimed is:

1. An improved peanut seed meter for continuously removing at a selected rate for planting a selected quantity of seed peanuts from a bulk quantity thereof contained within a hopper, said seed meter comprising:

a peanut hopper bottom including means for attachment thereof to the bottom rim of the peanut hopper, said hopper bottom comprising an outer disposed ring having an exterior diameter of a size for engaging the lower rim of the hopper and an inner diameter, the top surface of said ring sloping downwardly from said exterior diameter and inwardly toward said interior diameter, thereby to define an interior diameter rim which extends downwardly for at least a major circumferential portion thereof, an inner disposed dome means attached to said outer disposed ring, said inner disposed dome having a diameter substantially smaller than said outer disposed ring to define a peanut seed feeding space therebetween, seed drop cover means connecting said outer disposed ring and said inner disposed dome and having a substantial circumferential width, said seed drop cover means being disposed substantially above the level of the downwardly extending interior diameter rim, thereby to define a peanut seed exit volume beneath said seed drop cover means;

a floor plate disposed beneath said peanut hopper bottom and having a central opening therein adapted for receiving a drive shaft therethrough and having a generally annular shape, the top surface of which is disposed at least in very near proximity to the lower surface of said peanut hopper bottom, said floor plate including a seed drop aperture disposed below the seed drop cover of said peanut hopper bottom;

a rotating peanut seed plate having means for receiving rotational drive from the drive shaft extending through said floor plate and disposed on the top surface of said annular shaped floor plate and beneath said dome in the space defined therebetween, said seed plate having a major diameter corresponding to the interior diameter of said outer disposed ring and a minor diameter generally corresponding to the diameter of said dome disposed thereabove, with a downwardly sloping lateral surface disposed between the minor and major diameters, such that the sloping surface of said seed plate extends substantially between the lower surface of said inner disposed dome and the interior diameter rim of said outer disposed ring, said seed plate having grooves radially disposed therearound on the sloping surface for receiving peanut seeds and upon rotation of said seed plate discharging the carried peanut seeds through the seed drop aperture of said floor plate; and a taper gate extending from the seed drop cover of said peanut hopper bottom in a direction opposite to the rotational direction of said rotating seed plate, said taper gate having an inside radius substantially corresponding to that of the dome of said hopper bottom and disposed adjacently thereto and having a slightly larger outside radius with a center slightly offset from that of the inside radius to extend generally horizontally from the dome of said peanut hopper bottom in a curved path across the peanut feeding space to the outer disposed ring of the peanut hopper bottom, thereby to gate off a first portion of the peanut seeds from those being rotationally carried by said rotating seed plate, to permit a second portion of the peanut seeds to pass therebeneath into the peanut seed exit volume to the seed drop aperture of said floor plate for planting, and to channel the gated off peanut seeds for return to said rotating seed plate in a subsequent rotation.

2. The improved peanut seed meter of claim 1 wherein said peanut hopper bottom includes a groove at the exterior diameter thereof for engaging with the lower rim of the hopper.

3. The improved peanut seed meter of claim 1 wherein said peanut hopper bottom includes a plurality of upwardly extending and radially disposed ear members for receiving bolts to further secure said hopper bottom to the hopper.

4. The improved peanut seed meter of claim 1 wherein said peanut hopper bottom further includes a hopper lock bracket extending radially from the outer diameter thereof for mating engagement with a corresponding locking bracket on the hopper.

5. The improved peanut seed meter of claim 4 wherein said hopper lock bracket is securable by wing nut means.

6. The improved peanut seed meter of claim 1 wherein said peanut hopper bottom further comprises channel means for directing the flow of gated-off peanut seeds back onto said seed plate.

7. The improved peanut seed meter of claim 6 wherein said channel means on said peanut hopper bottom comprises a channel area on the outer disposed ring thereof disposed radially exterior of the seed drop cover and disposed at a lower vertical level than the seed drop cover to receive peanut seeds therefrom.

8. The improved peanut seed meter of claim 7 wherein said channel means extends generally circumferentially from adjacent the outside radius of said taper gate to the termination of the seed drop cover.

9. The improved peanut seed meter of claim 1 wherein the seed drop cover includes an upwardly inclined terminal portion to provide supplemental channeling to gated-off peanut seeds.

10. The improved peanut seed meter of claim 9 wherein the seed drop cover slopes downwardly adjacent said channel means for further supplementing the channeling of the gated-off peanut seeds.

11. The improved peanut seed meter of claim 6 wherein the downward and inward slope of the outer disposed ring of said peanut hopper bottom is of reduced magnitude within said channel for gated-off peanut seeds.

12. The improved peanut seed meter of claim 1 wherein the inner disposed dome of said peanut hopper bottom is supplementally attached to the outer disposed ring by at least one upwardly extending bridge means.

13. The improved peanut seed meter of claim 1 wherein the upper surface of the portion of the seed drop cover of said peanut hopper bottom radially adjacent said taper gate is substantially planar.

14. The improved peanut seed meter of claim 1 wherein the top surface of said floor plate engages the lower surface of said peanut hopper bottom at the downwardly extending interior diameter rim thereof.

15. The improved peanut seed meter of claim 1 wherein the downwardly extending interior diameter rim extends in a curved path radially outwardly in the area immediately radially in advance of the seed drop aperture of said floor plate disposed therebeneath to direct the flow of peanut seeds carried by said seed plate into the seed drop aperture for planting.

16. The improved peanut seed meter of claim 1 wherein said seed plate includes an annular groove on the underside thereof, and said floor plate includes a plurality of radially disposed and upwardly extending lugs for centering said seed plate with respect thereto.

17. The improved peanut seed meter of claim 1 wherein said seed plate includes drive lugs extending from the lower surface thereof for engaging with the shaft providing the rotational drive thereto.

18. The improved peanut seed meter of claim 1 wherein said peanut hopper bottom includes hinge brackets extending from the bottom surface thereof, and said floor plate includes hinge brackets corresponding to the hinge brackets disposed on the bottom surface of said peanut hopper bottom.

19. The improved peanut seed meter of claim 1 wherein the sloping surface of said seed plate is frusto-conical and slopes at an angle which is approximately 60° to the vertical.

20. The improved peanut seed meter of claim 1 wherein said taper gate is disposed at a slight angle to the horizontal with the base of said taper gate being inclined upwardly from the point of said taper gate, thereby to permit more room for peanut seeds to be directed into the peanut seed exit volume.

21. The improved peanut seed meter of claim 1 wherein said taper gate is at least in part crescent shaped and extends circumferentially from the point thereof approximately 180° to a point substantially above the seed drop aperture.

22. The improved peanut seed meter of claim 1 wherein said taper gate gradually increases in radial width from the point thereof until its width covers the peanut seed feeding space after approximately 107° in circumferential distance.

23. In a peanut seed meter having a peanut hopper bottom including an outer disposed ring having a downwardly disposed surface thereon for channeling peanuts downwardly therefrom, a seed drop cover disposed radially from the outer disposed ring to define a peanut seed exit volume therebeneath, means disposed beneath the seed drop cover for defining a seed drop aperture, a rotating seed plate for receiving channeled peanut seeds at least from the downwardly disposed surface of the outer disposed ring and having peanut receiving indentations thereon to pass rotationally into the peanut seed exit volume, the improvement comprising:

a taper gate extending generally horizontally adjacent the seed drop cover and in advance of the peanut seed exit volume and extending across and generally above the rotational path of the peanut receiving indentations of the rotating seed plate for gating off a first portion of the peanut seeds carried by the rotating seed plate and for permitting a second portion of the peanut seeds to pass therebeneath to the seed drop aperture within the peanut seed exit volume, said taper gate being generally half-cresent in shape and having a radially outwardly disposed outer edge which extends generally spirally across and above the peanut seed feeding indentations of the rotating seed plate toward the peanut seed exit volume.

24. The improvement of claim 23 wherein the peanut hopper bottom further includes channel means for sequentially cooperating with said taper gate in urging the flow of gated-off peanut seeds back onto the rotating seed plate for a further gating off by said taper gate.

25. The improvement of claim 23 wherein said taper gate is disposed at a slight angle to the horizontal, said taper gate having a base portion disposed adjacent the seed drop cover and a terminal portion extending therefrom, with said base portion inclined slightly upwardly from said terminal portion thereby to permit more room for peanut seeds for being directed into the peanut seed exit volume for exiting through the seed drop aperture.

26. The improvement of claim 23 wherein said taper gate includes a base portion disposed adjacent the seed drop cover and a terminal portion extending approximately 180° circumferentially therefrom.

* * * * *